United States Patent [19]

Preis

[11] Patent Number: 5,625,258
[45] Date of Patent: Apr. 29, 1997

[54] CLOCKED POWER SUPPLY

[75] Inventor: Karl-Heinrich Preis, Bühlertal, Germany

[73] Assignee: Robert Bosch GmbH, Stuttgart, Germany

[21] Appl. No.: 492,116

[22] PCT Filed: Dec. 3, 1994

[86] PCT No.: PCT/DE94/01446

§ 371 Date: Aug. 10, 1995

§ 102(e) Date: Aug. 10, 1995

[87] PCT Pub. No.: WO95/17032

PCT Pub. Date: Jun. 22, 1995

[30] Foreign Application Priority Data

Dec. 14, 1993 [DE] Germany ............ 43 42 590.9

[51] Int. Cl.$^6$ ........................................... B60Q 1/02
[52] U.S. Cl. ............................ 315/82; 315/77; 315/209 R; 315/208; 315/291; 315/308; 315/DIG. 7
[58] Field of Search ................................ 315/82, 77, 205, 315/208, 209 R, 219, 289, 291, 307, 308, DIG. 7

[56] References Cited

U.S. PATENT DOCUMENTS

| 4,507,698 | 3/1985 | Nilsson | 315/DIG. 7 X |
|---|---|---|---|
| 4,914,355 | 4/1990 | Mertens et al. | 315/307 |
| 5,113,085 | 5/1992 | Schäfer et al. | 315/307 X |
| 5,140,229 | 8/1992 | Yagi et al. | 315/307 |
| 5,198,728 | 3/1993 | Bernitz et al. | 315/307 |
| 5,241,242 | 8/1993 | Daub | 315/82 |

FOREIGN PATENT DOCUMENTS 4141804  2/1993  Germany.

OTHER PUBLICATIONS

"IAS Annual Meeting", IEEE Report, Oct. 2–6, 1977, Los Angeles, pp. 1110–1126.

Primary Examiner—Robert Pascal
Assistant Examiner—Haissa Philogene
Attorney, Agent, or Firm—Spencer & Frank

[57] ABSTRACT

A clocked power supply is proposed which contains a fault current detection means (32) which evaluates a voltage drop occurring at an ohmic measuring resistor (25), and emits a switch-off signal (40) to a clocked voltage converter (5). The ohmic measuring resistor (25) is arranged in a line (24) of the clocked voltage converter (5) in which the alternating operating current of the clocked voltage converter (5) flows, the frequency of which alternating operating current is equal to the frequency of a switching signal (23) with which a circuit breaker (16) is operated. In order to suppress the portion of the voltage drop which can be tapped at the ohmic measuring resistor (25) and whose frequency corresponds to that of the switching signal (23), means, for example a low pass filter (33) and/or a parallel capacitor (26) which bridges the ohmic measuring resistor (25) are provided. The clocked power supply according to the invention is particularly suitable for operating gas discharge lamps (7) which are installed for example in motor vehicles, an effective protection of persons (30) against inadvertent contact with live components being provided.

9 Claims, 1 Drawing Sheet

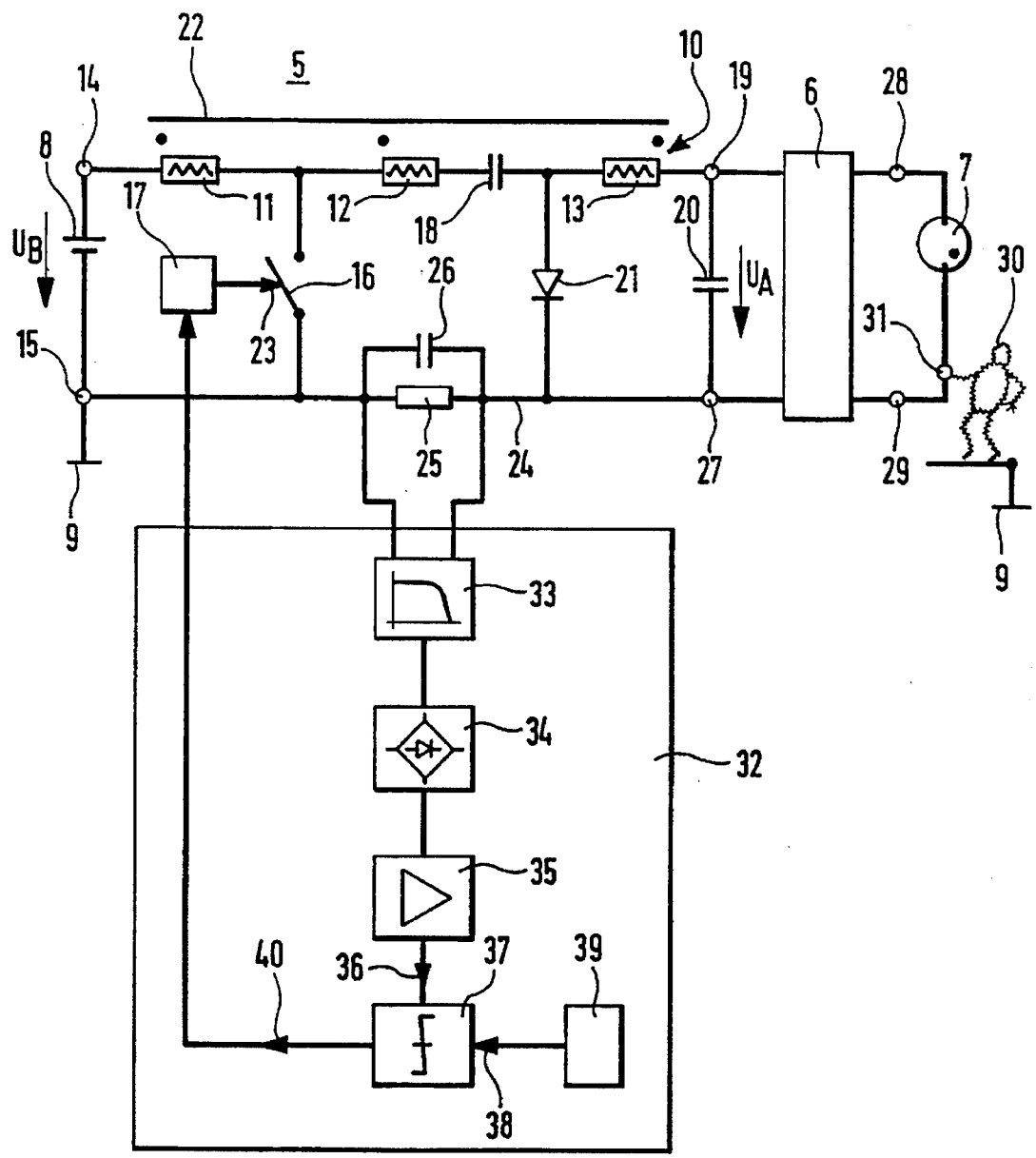

CLOCKED POWER SUPPLY

PRIOR ART

The invention is based on a clocked power supply of the type, having a voltage converter which is clocked by a switching signal and contains a line in which the alternating operating current of the clocked voltage converter flows, with the frequency of the alternating operating current being equal to the frequency of the switching signal, and having a fault current detection circuit which evaluates a voltage drop occurring at an ohmic measuring resistor and which emits a switch-off signal to the voltage converter. DE-A 41 17 589 corresponding to U.S. Pat. No. 5,241,242 discloses such a clocked power supply, which is constructed as an electronic ballast for operating highpressure gas discharge lamps. The electronic ballast contains a voltage converter which is operated in a clocked fashion by means of a switching signal and which initially converts the energy removed from a motor vehicle battery into a direct voltage. A power inverter which produces an alternating voltage of suitable frequency to supply energy to the gas discharge lamp is connected to the direct voltage output of the clocked voltage transformer. The frequency of the switching signal, which frequency corresponds to the operating frequency of the clocked voltage converter, is preferably in the kilohertz range, for example in the range between 10 kHz up to several hundred kHz, while the frequency of the operating voltage emitted to the lamp by the power inverter is preferably in the range of several hundred Hz.

The known clocked power supply contains a fault current detection means which evaluates a voltage drop occurring at an ohmic measuring resistor and which, if appropriate, emits a switch-off signal to the clocked voltage converter. The fault current detection means protects persons who inadvertently touch live parts of the ballast, in particular the connection lines of the gas discharge lamp. The ohmic measuring resistor connects a given terminal at the output of the clocked voltage converter to the electric ground of the vehicle. A fault current which can be evaluated can only occur with the previously known electronic ballast if there is an electrical isolation provided between the output of the clocked voltage converter and the electric ground of the vehicle which is electrically connected to the input of the clocked voltage converter via the battery of the motor vehicle. For electrical isolation, a power transformer which is arranged in the clocked voltage converter and has electrically isolated primary and secondary windings is arranged.

DE-PS 41 41 804 also discloses an electronic ballast for operating gas discharge lamps, which ballast contains a clocked voltage converter to whose output a power inverter is connected in order to provide a suitable alternating voltage for supplying energy to the gas discharge lamp. The potentials across the gas discharge lamp are fixed such that, at least when averaged over time, the gas discharge lamp always has negative potential in relation to the components surrounding it, for example the light or the body of the motor vehicle. This measure prevents a diffusion of ions into the lamp body which damages the gas discharge lamp. The clocked voltage converter is constructed as a simple constant-current step-up transformer which, in addition to the inductor, has as essential components a switching element, a rectifier diode and an output capacitor. Measures which ensure protection of persons against accidental contact with live components are not described.

In an IEEE Report "IAS Annual Meeting", 2–6 Oct. 1977, Los Angeles, p. 1113, a clocked voltage converter is described which has a high degree of efficiency. The clocked voltage converter contains a transformer core which has two separate windings. The connection to a capacitor which is arranged at the output and across which the output direct voltage occurs is made via a capacitor and a separate inductor. The transmission of power to the output can only take place capacitively. The previously known voltage converter can serve as a basis for a further development.

The invention is based on the object of disclosing a clocked power supply which has a fault current detection means and contains a clocked voltage converter which is easy to realize.

SUMMARY OF THE INVENTION

The above object is achieved by a clocked power supply, in particular for operating gas discharging lamps, having a voltage converter which is clocked by a switching signal and contains a line in which the alternating operating current of the clocked voltage converter flows, with the frequency of the alternating operating current being equal to the frequency of the switching signal, and having a fault current detection means which evaluates a voltage drop occurring at an ohmic measuring resistor and which emits a switch-off signal to the voltage converter wherein: the ohmic measuring resistor is arranged in the line which conducts the alternating operating current, and wherein means are provided for suppressing the portion of the voltage drop which occurs at the ohmic measuring resistor and whose frequency corresponds to that of the switching signal.

Advantages of the invention

The clocked power supply according to the invention has the advantage that no electrical isolation is required between live components, which can be touched by persons, at the output and the input of a clocked voltage converter. The circuitry of the voltage converter can therefore be designed exclusively with the aim of achieving a maximum degree of efficiency.

According to the invention there is provision for an ohmic measuring resistor, at which a voltage drop corresponding to the fault current can be tapped, to be arranged in the clocked voltage converter in a line conducting an alternating operating current, and for means to be provided for suppressing the portion of the voltage signal which can be tapped at the measuring resistor and whose frequency corresponds to the switching frequency of the clocked voltage converter.

The clocked power supply according to the invention permits a fault current which may occur and whose frequency deviates from the switching frequency of the clocked voltage converter to be detected. The detection of a fault current which has direct current components is particularly simple.

Advantageous developments and refinements of the clocked power supply according to the invention are disclosed and claimed.

A particularly simple means for suppressing the portion of the fault current signal which can be tapped at the ohmic resistor and whose frequency corresponds to the switching frequency of the clocked voltage converter is a low pass filter whose cut-off frequency lies below the clock frequency.

Another particularly advantageous development makes provision for a capacitor which is switched in parallel with the ohmic measuring resistor to be provided as a means for suppressing the portion of the fault current signal which can be tapped at the ohmic measuring resistor and whose frequency corresponds to the clock frequency of the clocked voltage converter. The significant advantage of this measure lies in the fact that virtually the entire alternating operating current of the clocked voltage converter can flow via the capacitor which is located in parallel with the ohmic measuring resistor. In this development, the ohmic measuring resistor inserted into the line conducting the alternating operating current only reduces the degree of efficiency of the clocked voltage converter very slightly. The frequency-dependent capacitive resistance of the capacitor simultaneously realizes the low pass function.

In another refinement there is provision for the fault current detection means to contain a rectifier for rectifying the fault current signal which can be tapped at the ohmic resistor. This measure can also be used to detect a fault current signal which does not have a direct current portion.

In an advantageous refinement of the clocked power supply according to the invention a power inverter which is arranged at the output of the clocked voltage converter is provided. The power inverter converts the direct voltage across the output of the clocked voltage converter into an alternating voltage which is suitable, for example, for supplying energy to a gas discharge lamp. Damaging ion migrations in the gas discharge lamp are prevented with this measure.

An advantageous development of the clocked power supply according to the invention relates to the clocked voltage converter which contains a single transformer which bears three separate windings. A first winding can be connected to a circuit breaker so as to be parallel to an energy source. The first winding, and a second winding which is connected in series with a longitudinal capacitor, together with a diode, form a charging circuit for the longitudinal capacitor when the circuit breaker is opened. The series circuit consisting of the first winding, the second winding and the longitudinal capacitor is connected via a third winding to an output-side smoothing capacitor. The advantage of this circuit is that the transmission of power to the output takes place both capacitively and inductively via the transformer. An extremely high overall degree of efficiency of the voltage converter is obtained.

The clocked power supply according to the invention is particularly suitable as a ballast for operating gas discharge lamps which are arranged in a motor vehicle. When they are used in this way, it is not possible to rule out persons inadvertently touching live components or connection lines when carrying out inexpert servicing work or repair work.

Further advantageous developments and refinements of the clocked power supply according to the invention emerge from further dependent claims in conjunction with the following description.

BRIEF DESCRIPTION OF THE DRAWING

The figure is a circuit diagram clocked power supply according to the invention.

DETAILED DESCRIPTION OF THE PREFERRED EMBODIMENT

The clocked power supply according to the invention contains a clocked voltage converter 5 which is connected to a gas discharge lamp 7 via a power inverter 6. The voltage converter 5 contains a transformer 10 which has a first winding 11, a second winding 12 and a third winding 13. The first winding 11 and the second winding 12 form a divided primary winding while the third winding 13 constitutes a secondary winding. An energy source 8 which provides a prescribed input voltage $U_B$ is located between a first input terminal 14 connected to the first winding 11 and a second input terminal 15 connected to ground 9. A connection point between the first winding 11 and the second winding 12 can be connected to ground 9 via a circuit breaker 16. In order to open and close the circuit breaker 16, a switching signal 23 which is emitted by a clock circuit 17 is provided.

The terminal, facing away from the first winding 11 of the transformer 10, of the second winding 12 is connected to a first output terminal 19 via the series circuit comprising a longitudinal capacitor 18 with the third winding 13 with opposite polarity relative to the first two windings 11, 12. The connection point between the longitudinal capacitor 18 and third winding 13 is connected via a diode 21 to a second output terminal 27. A smoothing capacitor 20 across which an output voltage $U_A$ occurs is connected between the output terminals 19, 27.

The three windings 11, 12, 13 are wound on a common transformer core 22, the terminals of the windings 11, 12, 13 with the same direction of winding being identified by dots in each case in the figure.

In a line 24 which lies between ground 9 and the second output terminal 27 an alternating operating current of the clocked voltage converter 5 flows. An ohmic measuring resistor 25, which is bridged with a parallel capacitor 26, is inserted in the line 24.

The power inverter 6 which provides an alternating operating voltage for the gas discharge lamp 7 at a first and at a second lamp terminal 28, 29 is connected to the two output terminals 19, 27. A person 30 who is capacitively and/or electrically connected to ground 9 can touch live components of the clocked power supply at a contact point 31.

A voltage drop occurring across the ohmic measuring resistor 25 is fed to a fault current detection means 32. After filtering in a low pass filter 33, rectifying in a rectifier 34 and amplifying in an amplifier 35, the voltage drop which can be tapped at the measuring resistor 25 is fed as a processed signal 36 into a comparator 37 which compares the processed signal 36 with a prescribed threshold 38 which provides a limit value transmitter 39. The comparator 37 emits a switch-off signal 40 to the clock circuit 17.

The clocked power supply according to the invention operates as follows:

The clocked voltage converter 5 has the function of converting the prescribed input voltage $U_B$ into the prescribed output voltage $U_A$ which can be tapped between the first and second output terminals 19, 27. Devices which are provided for keeping the output voltage $U_A$ constant as a function of measurement variables, for example the current flowing through the gas discharge lamp 7 and/or the lamp operating voltage and/or the output voltage $U_A$ itself and/or the input voltage $U_B$, are not shown in the figure in greater detail. These influences are taken into account during the generation of the switching signal 23 in the clock circuit 17. The switching signal 23 can have a variable frequency and/or a variable pulse duty factor.

The frequency of the switching signal 23 preferably lies in the kilohertz range. The frequency, or more precisely the basic frequency, of the generally square wave-shaped switching signal 23 lies for example in a range between 10 kHz and several hundred kHz. Preferably a power MOSFET is provided as circuit breaker 16.

For the following voltage information it is assumed that the number of turns of the three windings 11, 12, 13 are preferably in a ratio 1:2:3 and that the input voltage $U_B$ is 10 volts. It will be assumed that the output voltage $U_A$ is set at a value of −150 volts. It will be assumed that the circuit breaker 16 is initially closed. The first winding 11 is thus connected to the input voltage $U_B$ and the current through the first winding 11 rises. If the circuit breaker 16 is then opened, the current flowing through the circuit breaker 16 commutates to the second winding 12 and charges the longitudinal capacitor 18 via the conductive diode 21 to a positive voltage of 160 volts in the example. If the circuit breaker 16 is closed again, the first winding 11 is connected to the input voltage $U_B$ again and the left-hand side of the longitudinal capacitor 18 is connected via the second winding 12 and the circuit breaker 16 to a voltage of $-2 \times U_B$, that is to say to $-20$ volts, since the transformer component formed from the first two windings 11, 12 has a transmission ratio of 2. A negative voltage of $-180$ volts is applied to the diode 21 so that it blocks. The smoothing capacitor 20 located between the two output terminals 19, 27 is now connected via the voltage of $-30$ volts induced in the third winding 13 to this negative voltage (the transformer component formed from the first winding 11 and the third winding 13 has a transmission ratio of 3). An output voltage $U_A$ of $-150$ volts (the negative capacitor voltage at the longitudinal capacitor 18 is reduced by an amount equal to the input voltage $U_B$) is therefore obtained. The polarity of the voltage at the third winding 13 is always such that the smoothing capacitor 20 is not discharged during the charging phase of the longitudinal capacitor 18. The condition for this is on the one hand that, as far as the number of turns is concerned, the number of turns of the third winding 13 is equal to the sum of the number of turns of the first and second windings 11, 12. Accordingly, the number of turns can, for example, also be in a ratio of 1:1:2.

The direct voltage made available at the two output terminals 19, 27 is generally not yet directly suitable to supply the gas discharge lamp 7 which is provided as an example of an electric load. A direct voltage supply would lead to overheating of the anode which would destroy the gas discharge lamp 7 and the ionized gases contained in the lamp would become disassociated. Therefore the power inverter 6 is provided, which forms an alternating voltage which is suitable for the gas discharge lamp 7 from the output voltage $U_A$ present between the two output terminals 19, 27. The power inverter 6 can be realized, for example, as a half-bridge or full-bridge circuit. An exemplary embodiment of the power inverter 6 is described in greater detail in the document DE-PS 41 41 804 mentioned at the beginning. The power inverter 6 changes the polarity of the operating voltage, which can be removed at the two lamp terminals 28, 29, for the gas discharge lamp 7 in synchronism with a prescribed switching frequency which can be, for example, several hundred Hz. In the exemplary embodiment (shown in the figure) of the clocked power supply the negative potential across the first output terminal 19 has the comparatively low-frequency clock of several hundred Hz is alternately fed to the first and second lamp terminals 28, 29. Therefore, when averaged over time, the potential present at the gas discharge lamp 7 is negative in comparison with the ground potential 9. This measure also prevents a damaging migration of ions in which ions could migrate into the lamp body. Since the environment of the lamp, for example a light or for example a body of a motor vehicle is, when averaged over time, at positive potential in relation to the gas discharge lamp 7, positive ions are forced into the lamp plasma.

It is not possible to rule out a person 30 touching live components of the clocked power supply during inexpert servicing work or repair work.

Even though the clocked voltage converter 5, and possibly the power inverter 6, are arranged within a hermetically sealed housing which may, in any case, only be opened by specially trained persons, it is not possible to rule out someone touching inexpertly exposed feed lines between the gas discharge lamp 7 and the two lamp terminals 28, 29.

Live components could also be touched when a lamp was being changed incorrectly.

A current flowing through the person 30, which current is referred to as a fault current, flows from the contact point 31 to ground 9. The fault current can be either a direct current or an alternating current. A direct current occurs in particular as a result of direct skin contact with ground 9. Soiling or moisture in items of clothing also make an electrical connection to ground 9. A capacitive displacement current always occurs without electrical connection. The absolute value of the fault current is to be limited to values which do not present a hazard. The maximum acceptable fault current lies at present in a range between 10 and 30 mA.

The fault current flowing to ground 9 through the person 30 also occurs in the ohmic measuring resistor 25, the fault current being superimposed on the alternating operating current of the clocked voltage converter 5. Since the alternating operating current of the clocked voltage converter 5 can be several amperes, in order to detect a fault current reliably, means are provided for suppressing the portion of the fault current signal which can be tapped at the ohmic measuring resistor 25 and whose frequency corresponds to that of the switching signal 23.

For example, the low pass filter 33, which filters out the switching signal portion from the voltage signal which can be tapped at the measuring resistor 25 is provided. The cut-off frequency of the low pass filter 33 is preferably fixed at a value which does not yet cover the low switch-over frequency which is generated by the power inverter 6. A fault current signal with the low frequency of the power inverter 6 which is rectified with the rectifier 34 which may be present can thus be evaluated. The rectifier 34 is provided to simplify the processing of signals, the electronic function units downstream only having to process direct voltage signals. The amplifier 35 may also be provided to raise the signal to a prescribed voltage level which can be easily handled. The processed signal 36 is compared in the comparator 37 with the threshold value 38 which the limit value transmitter 39 provides. The threshold value 38 is a measure of the maximum acceptable fault current, the switch-off signal 40 being output by the comparator 37 when the said threshold value is exceeded. In the exemplary embodiment shown, the switch-off signal 40 is fed to the clock circuit 17. A switching off of the switching signal 23 by opening the circuit breaker 16 causes the clocked voltage converter 5 to be switched off. Instead of the switch-off signal 40 being supplied to the clock circuit 17 as shown in the exemplary embodiment, it is also possible to open a switch not shown in the figure, for example a relay. The switching off of the clocked power supply such that the maximum voltage which occurs is reduced at all possible contact points 31 to values which do not present a hazard is essential.

The ohmic measuring resistor 25 arranged in the line 24 constitutes a loss resistor for the alternating operating current of the clocked voltage converter 5. In principle, it is possible to construct the ohmic measuring resistor 25 to have very low impedance, for example less than 0.1 ohm. A simple evaluation of the processed signal 26 is then only possible after a comparatively large amplification by means of the amplifier 35. The particularly advantageous measure which provides the parallel capacitor 26 remedies this. The parallel capacitor 26 bridges the ohmic measuring resistor 25 and, if the capacitance is fixed at a suitable level, therefore permits the alternating operating current of the clocked voltage converter 5 to be conducted in the line 24 virtually without loss. The use of the parallel capacitor 26 permits the resistance value of the ohmic measuring resistor 25 to be fixed at higher values, for example at 10 ohm. The separately constructed amplifier 35 can be dispensed with, if appropriate. The amplification function of the comparator 37 may be sufficient alone. Using the parallel capacitor 26 also realizes the function of the low pass filter 33, which can be dispensed with. The formation of a defined cut-off frequency is not possible with the parallel capacitor 26 alone because its capacitive resistance only approaches infinity at a frequency which is tending toward zero. However, given a sufficiently large difference between the frequency of the switching signal 23 and the switch-over frequency of the power inverter 6 it is readily possible, by correspondingly fixing the value of the capacitance of the parallel capacitor 26, for the switch-over frequency of the power inverter 6, and thus a possible fault current with the corresponding frequency, not to be completely short-circuited by the parallel capacitor 26. If the frequency of the switching signal 23 is assumed to be 200 kHz and the switch-over frequency of the power inverter 6 is assumed to be 400 Hz, the capacitance of the parallel capacitor 26 is approximately 1 microfarad.

A significant advantage of the clocked power supply according to the invention is that no electrical isolation has to be provided between the energy source 8 and the load, the gas discharge lamp 7. Therefore it is readily possible to connect, for example, the second output terminal 27 which has a low-impedance connection to ground 9 via the ohmic measuring resistor 25 directly to the first or to the second lamp terminal 28, 29 alternately via the power inverter 6. The electrical isolation, provided using the longitudinal capacitor 18, between the second input terminal 14 and the first output terminal 19 is given by virtue of the circuitry design of the clocked voltage converter 5 selected. In principle, such an electrical isolation is not required at this point either.

I claim:

1. A clocked power supply, in particular for operating gas discharge lamps, having a voltage converter which is clocked by a switching signal and contains a line in which the alternating operating current of the clocked voltage converter flows, the frequency of which alternating operating current is equal to the frequency of the switching signal, having a fault current detection means which evaluates a voltage drop occurring at an ohmic measuring resistor and which emits a switch-off signal to the voltage converter, wherein the ohmic measuring resistor is arranged in the line which conducts the alternating operating current, and wherein means, which bridge said ohmic measuring resistor, are provided for suppressing the portion of the voltage drop which occurs across the ohmic measuring resistor and whose frequency corresponds to that of the switching signal.

2. The clocked power supply as claimed in claim 1, wherein said means comprising a parallel capacitor which bridges the ohmic measuring resistor.

3. The clocked power supply as claimed in claim 2, wherein the capacitance of the parallel capacitor is fixed at a value in which the capacitive resistance is negligibly small in relation to the frequency of the switching signal.

4. The clocked power supply as claimed in claim 1, wherein the fault current detection means has a rectifier for rectifying the voltage drop occurring at the ohmic measuring resistor.

5. The clocked power supply as claimed in claim 1, wherein the clocked voltage converter contains a transformer which has three windings, the first winding being supplied with an input voltage $U_B$ in series with a circuit breaker controlled by the switching signal, and the first winding and a second winding in series with a longitudinal capacitor and a diode forming a charging circuit for the longitudinal capacitor when the circuit breaker is opened, and wherein a smoothing capacitor which is connected between output terminals is connected to the longitudinal capacitor via a third winding, all windings being arranged on a common transformer core.

6. The clocked power supply as claimed in claim 5, wherein the number of turns of the third winding corresponds essentially to the sum of the number of turns of the first and second windings.

7. The clocked power supply as claimed in claim 6, wherein the ratio of the number of turns of the three windings is essentially 1:2:3 or 1:1:2.

8. The clocked power supply as claimed in claim 1, wherein a power inverter is connected downstream of the clocked voltage converter.

9. The clocked power supply as claimed in claim 1, which is used in a motor vehicle for supplying energy to a gas discharge lamp which is provided in a headlight.

* * * * *